Sept. 5, 1967  W. BATTENFELD ET AL  3,339,232
APPARATUS FOR THE PRODUCTION OF HOLLOW BODIES IN
A BLOWING PROCESS
Original Filed July 7, 1964  2 Sheets-Sheet 1

INVENTORS
Werner Battenfeld
Erland Langsch
BY
Ernest Montague
Attorney

United States Patent Office 3,339,232
Patented Sept. 5, 1967

3,339,232
APPARATUS FOR THE PRODUCTION OF HOLLOW
BODIES IN A BLOWING PROCESS
Werner Battenfeld, Lindenstrasse, and Erhard Langecker,
Hohbuschener Weg, both of Meinerzhagen, Germany
Original application July 7, 1964, Ser. No. 380,774, now
Patent No. 3,300,556, dated Jan. 24, 1967. Divided
and this application June 21, 1966, Ser. No. 559,182
Claims priority, application Germany, July 8, 1963,
B 72,591
10 Claims. (Cl. 18—5)

This is a division of the co-pending patent application Ser. No. 380,774, filed on July 7, 1964, now patent No. 3,300,556, dated Jan. 24, 1967.

The present invention relates to an apparatus for the production of hollow bodies as bottles, ampullae, canisters, tube fittings or the like, in a blowing process from, preferably, hose-shaped starting products, whereby the axis of the hose-shaped starting product deviates from the axis and the axes, respectively, of the opening or openings of the hollow body and hollow bodies, respectively.

Until now two plastic bands disposed parallel to each other have been used, which are arranged with their wide faces opposite each other. The bands are guided with their longitudinal edges along the blow nozzles of the pressure medium and are sealed about the blowing nozzles during the closing of the mold-half, for the production of the above-mentioned parts. Upon injection of the pressure medium, the bands are blown up to hollow bodies. Instead of these bands, a U-shaped band also has been used. In this case, the air feed takes place through the blowing nozzles from one side only. These blowing nozzles can have a diameter merely equal to the length of the band, so that the openings of the hollow body are disposed crosswise to the extrusion direction of the band, which is not possible until now in connection with hose-like starting products.

In case of the use of hose-like starting products the blowing up of the hose-like starting product takes place partly from the side by insertion of a hollow needle, which, however, merely pierces the hose wall and in particular with a comparatively small diameter, depending upon the size of the part and the wall thickness of the hose-shaped starting product, up to about 6 mm., whereby, however, at this point the hose-shaped starting product does not simultaneously deform into a bottle-neck-like part.

These known methods have, however, the drawback that the bands adhere easily to each other during the closing of the mold and the blowing up is prevented. Also, a U-shaped band or two smooth bands are more difficult to produce than a hose-like starting product.

It is an object of the present invention to provide an apparatus for the production of hollow bodies in a blowing process for the working in accordance with the method of the present invention, wherein, for the sealing of the free end of the hose disposed oppositely to the axially arranged preliminary blowing nozzle, a spring-biased pair of battens sealingly clamping the hose end and provided outside of the hollow mold is arranged, which pair of battens can be provided also under circumstances in addition also on the hose entrance side of the hollow mold around the preliminary blowing nozzle.

Instead of this spring-biased pair of battens, it is also possible to provide an integral pair of frames for the sealing clamping of the starting product or also a multi-part frame, the parts of which are removable in different directions to the axis of the calibrated pin.

During the practical realization of the present invention, the preferably hose-shaped starting product is extruded by means of a nozzle of a press, for instance, in its plastic state and is moved between a multi-part mold. This multi-part hollow mold may have at its free axial ends or at both ends means, such as spring-biased battens, which close up both hose ends prior to the closing of the blowing mold. A bore is provided in halves in a pair of battens, in which an initial or first blowing pin is inserted prior to its closing, through which blowing pin the pressure medium is fed after closing of the hose by the battens. The hose starting product is widened to the approximate final shape and then the actual blowing mold is closed completely. By this arrangement, the material extending beyond the actual mold is squeezed off in a known manner and sealed together, so that one or a plurality of hollow bodies are formed, which, however at this stage, do not have any opening.

An opening forming pin or lateral blowing pin is now inserted through a neck or opening provided in the wall of the mold. This pin has a hollow, needle-shaped point, which pierces the widened hose-shaped starting product and feeds therethrough further pressure medium into the hollow space inside the hollow body. The pin forming the hollow needle opening has a shape which widens conically rearwardly of the needle-shaped point, into a predetermined diameter substantially equal to that of the desired opening, and the pin is then inserted further into the hollow space. The opening is widened, by the pressure medium which flows from the inside, between the pin and the still plastic material, outwardly, so that a calibrated opening is created. This pin can be shaped such, as is conventional in connection with the manufacture of bottleneck openings, and the superfluous material is punched away by the axial movement of the pin, or the material is upset together by means of an additional sleeve.

In this manner, an opening can be formed at any point in a blowing body, which opening is ready for use upon opening of the mold. Thus, for instance, in case of a canister, the airing opening can be provided outside of the mold division without additional work. In this case it need not be closed by spring-biased strips. The feeding of the pressure medium takes place through the filling opening. The same applies to the production of, for instance, raw fittings of all kinds, for instance of cross members, T-pieces, branches and the like.

With these and other objects in view, which will become apparent in the following detailed description, the present invention will be clearly understood in connection with the accompanying drawings, in which.

Figure 1:
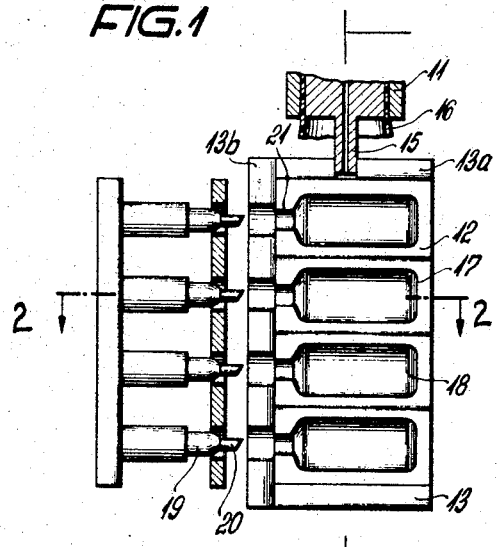
FIGURE 1 is a schematic elevation, partly in section, indicating the mold division of a blow mold with a plurality of ampulla-shaped inserts.
Figure 2:
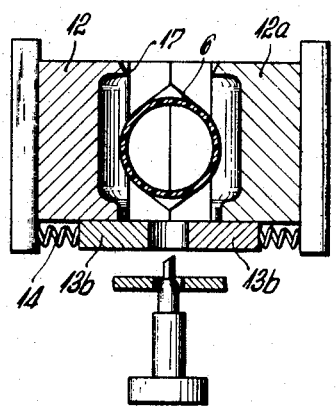
FIG. 2 is a section along the lines 2—2 of FIG. 1.
Figure 3:
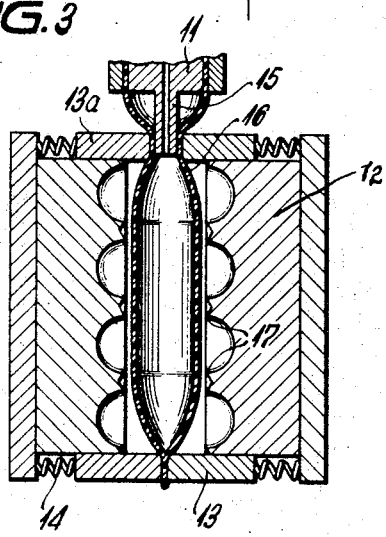
FIG. 3 is a vertical section along the lines 3—3 of FIG. 1, however, shown in a plane turned by an angle of 90°.

Referring now to the drawings and in particular to FIGS. 1 to 4, the apparatus of the embodiments of the present invention is demonstrated schematically. The apparatus comprises a hose nozzle 11, from which the plastic hose-shaped starting product 16 emerges. If the working is not performed with heat, the nozzle 11 includes a heating chamber, from which the re-heated pipe emerges downwardly as a plastic hose and enters between the divided mold 12, which is surrounded on both sides by strips or by a closed frame 13. These strips or the frame are movable in the direction of movement of the mold 12. During the open position of the mold, these strips or frame parts project by the force of springs 14 (FIGS. 2 and 3) beyond the closing faces of the mold depending upon the size of the hollow body to be blown up. Upon initial closing of the mold, these strips or frames close up the hose at the bottom and under certain circumstances also at the top. A base is provided in the upper strip 13a for a pre-blowing pin 15 and the hose-shaped starting product 16 is widened to the approximate size and width, respectively, of the hollow body to be produced, so that it comes nearly to engagement on the lateral strip 13b. A further strip can also be provided on the opposite side. During the further closing movement of the mold, the hose is clamped and sealed together about the hollow body 18 to be blown up by means of cutting edges 17. The air present in the hose-shaped starting product prevents the hose parts from adhering together, and the mold is filled by simply and completely forming the hollow body without an opening.

Figure 4:
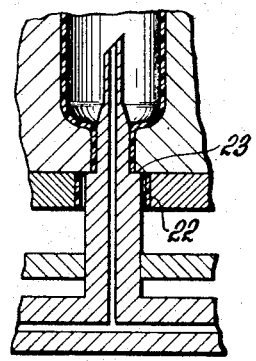
FIG. 4 is a fragmentary section of the mold, disclosed at an enlarged scale, shown in its closed position and inserted calibrating pin.

Now, a lateral or piercing blowing pin comprising a calibrating pin 19 and a hollow needle-shaped point 20 is put into motion in the direction of the blowing part. The hose or the hollow body is pierced forming a pierced neck opening and a pressure medium is blown into the hollow body by means of a mechanical valve through the blowing and calibrating pin 19. Due to the pressure above atmospheric pressure in the blowing body and the smaller diameter of the needle-shaped point 20, relative to neck diameter 21 of the mold (FIG. 1), the hose material at the pierced neck opening is widened, so that the calibrating pin 19 can be inserted further without moving this material 22, as shown in FIG. 4, into the hollow body, but rather this material is pressed toward the neck wall 21 and the waste material is separated by edge 23 from the blowing body.

The upper spring-biased strip 13a is not absolutely necessary. It is important, however, that the air medium and the pressure medium, respectively, are pressed into the hose closed by the lower strip 13 through the hose nozzle 11, so that the hose-shaped starting product widens to the approximate size of the blowing part. It is of course also possible to proceed in the opposite manner.

Figure 5:
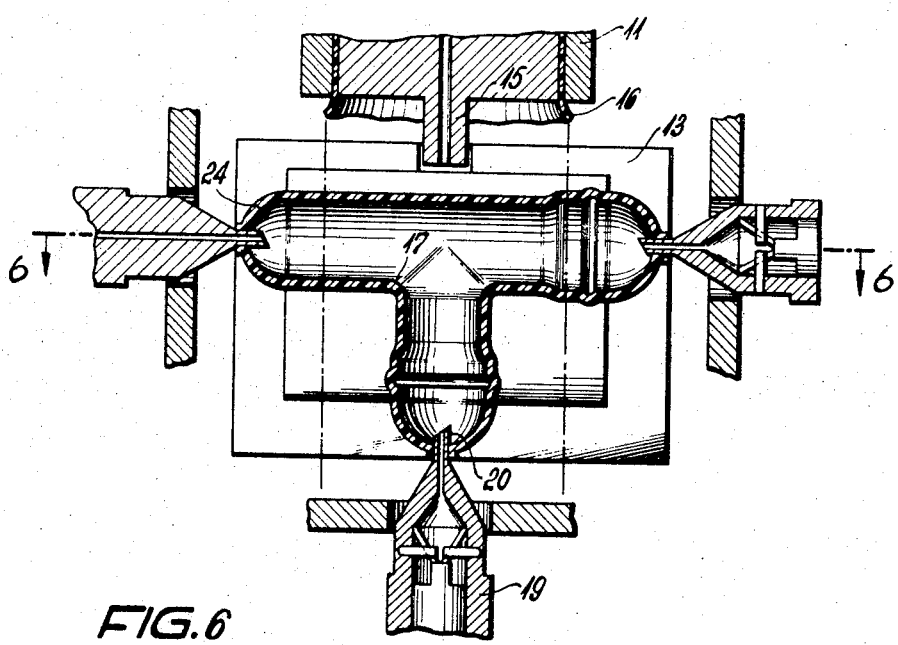
FIG. 5 is a vertical section of a pipe fitting, to indicate an application of the showing in FIG. 1.
Figure 6:
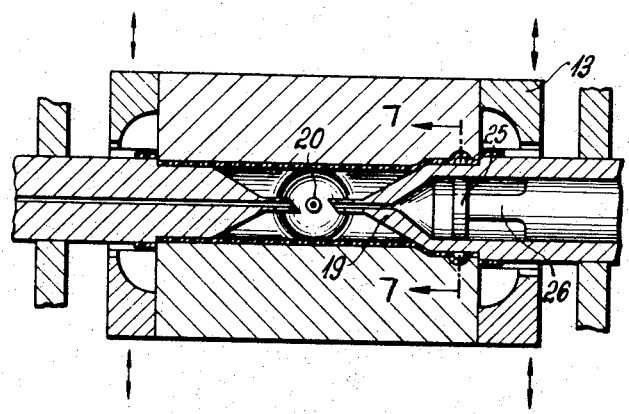
FIG. 6 is a horizontal section along the lines 6—6 of FIG. 5 with the calibrating pins inserted into the pierced openings.
Figure 7:
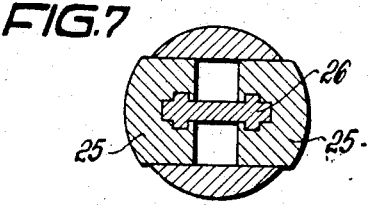
FIG. 7 is a section along the line 7—7 of FIG. 6.

Referring now to FIGS. 5-7, the application of the present invention for the manufacture of a T-fitting is disclosed. In this case, the lower hollow needle 20 projects into the half-ball-shaped recess in the frame 13, so that during the preliminary blowing of the hose-shaped starting product, the latter is pierced at these points. The preliminary blowing takes place through the preliminary blowing pin 11 or through the lower hollow needle 20, so that the hollow space, which is defined by the two frames 13 is substantially filled out by the preliminary or intermediate blowing body. During the continued closing movement, the half-ball-shaped recesses 24 are also filled out and pierced by the hollow needle 20. Upon termination of the closing movement, the plastic material is sealed together and separated by the squeezing edges 17. Upon termination of the closing movement or shortly before, the frame 13 is withdrawn at both sides by a mechanical movement, for instance, by means of a hydraulic or pressurized air cylinder, which replaces the springs 14 of the previously described embodiment. Accordingly, the still plastic half balls 24 lose their support in the mold. The frame 13 can consist, under certain circumstances, of a plurality of parts which can be moved away from the calibrating pin axis in different directions. Due to the inner pressure, which is maintained now by the hollow needles 20, the opening formed by the hollow needles is further widened, and the calibrating pin 19 can be inserted into the fitting, without sliding simultaneously the waste material into the hollow body. The waste material is likewise separated from the blowing part, for example, as shown in FIG. 4. In this manner, a finished fitting ready for use is obtained.

One portion of the fittings is equipped with an edge flange, in which a circular cord is inserted for the sealing of the joint (not shown). This edge flange blows itself up without difficulty up to the squeeze-seam. At this point, the groove would be normally not clean without additional work. In order to save this additional work, as is shown in FIG. 6, a calibrated slide pair 25 is inserted in the blowing pin 19 in a cross-break, which calibrated slide pair 25 is operated in conventional manner by means of a spreading wedge 26, so that these flange fittings can also be blown into a finished product already for use.

The movements of the parts of the apparatus can be performed manually, as well as mechanically and even, preferably, automatically. It is to be understood that the shown and described embodiments constitute merely examples for the realization of the present invention, which are within the scope of the present invention, which are, however, by no means limited thereto and other embodiments and applications are possible within the scope of the invention.

While we have disclosed several embodiments of the present invention, it is to be understood that these embodiments are given by example only and not in a limiting sense, the scope of the present invention being determined by the objects and the claims.

We claim:

1. An apparatus for producing predetermined hollow bodies with calibrated neck openings from hose-shaped starting products, comprising
    a multi-part mold adapted to receive a hose-shaped starting product,
    a blowing pin means disposed axially relative to said hose-shaped starting product outside of and adjacent to said mold, and for blowing up said starting product into an intermediate hollow body,
    a pair of clamping means disposed at the end of said hose-shaped starting product opposite said blowing pin means and clamping sealingly said opposite end of said hose-shaped starting product,
    said intermediate hollow body within said mold forming at least one enclosed hollow body,
    said mold having an interior complementary to the shape of said predetermined hollow bodies to be produced and defining at least one neck communicating said interior of said mold,
    said at least one neck having an inner periphery complementary to said calibrated neck openings to be produced, respectively,
    piercing blowing pin means comprising a hollow needle-shaped point,
    said needle-shaped point substantially smaller than said inner periphery of said at least one neck, and
    said piercing blowing pin means adapted to be inserted through said at least one neck of said mold and for piercing said at least one enclosed hollow body with said needle-shaped point thereby forming a pierced opening therein, and for feeding a pressure medium through said needle-shaped point and said pierced opening into said at least one enclosed hollow body thereby displacing and widening said at least one enclosed hollow body within the range of said pierced opening outwardly against said inner periphery of said at least one neck.

2. The apparatus, as set forth in claim 1, wherein
    said pair of clamping means comprises a pair of spring-biased battens movably attached to said multi-part mold.

3. The apparatus, as set forth in claim 1, which includes
    a pair of battens disposed on the side of the entering end of said hose-shaped starting product about said blowing pin, clamping said entering end of said hose-shaped starting product.

4. The apparatus, as set forth in claim 1, wherein said pair of clamping means comprises a pair of integral frame members.

5. The apparatus, as set forth in claim 1, wherein said pair of clamping means comprises a multi-part frame, said parts being removable in different directions relative to the axis of said blowing pin.

6. An apparatus for producing predetermined hollow fittings with calibrated neck openings from hose-shaped starting products, comprising
a multi-part mold adapted to receive a hose-shaped starting product,
at least one blowing pin means disposed axially relative to said hose-shaped starting product outside of and adjacent to said mold, and for partially blowing up said starting product into an intermediate hollow body,
a frame disposed at the end of said hose-shaped starting product opposite said blowing pin means and clamping sealingly said opposite end of said hose-shaped starting product, and
said frame having about half-ball-shaped recesses,
said intermediate hollow body within said mold forming at least one enclosed hollow body,
said mold having an interior complementary to the shape of said predetermined hollow fittings to be produced and defining at least one neck communicating said interior of said mold,
said at least one neck having an inner periphery complementary to said calibrated neck openings to be produced, respectively,
piercing blowing pin means comprising a hollow needle-shaped point,
said needle-shaped point substantially smaller than said inner periphery of said at least one neck, and
said piercing blowing pin means adapted to be inserted through said at least one neck of said mold and for piercing said at least one enclosed hollow body with said needle-shaped point thereby forming a pierced opening therein, and for feeding a pressure medium through said needle-shaped point and said pierced opening into said at least one enclosed hollow body thereby displacing and widening said at least one enclosed hollow body within the range of said pierced opening outwardly against said inner periphery of said at least one neck.

7. The apparatus, as set forth in claim 6, wherein said piercing blowing pin means further comprises at least one calibrating, blowing-air feeding pin,
a calibrating pair of slides disposed within said calibrating pin for the calibration of the squeeze seam within the range on both sides of the split of said mold, and
wedge means controlling the position of said pair of slides.

8. An apparatus for forming a predetermined shaped hollow body with a calibrated neck opening, comprising a mold adapted to receive a starting product therein, means for blowing up said starting product into an intermediate hollow body,
means for sealing said intermediate hollow body within said mold to form at least one enclosed hollow body,
said mold having an interior complementary to the shape of said predetermined shaped hollow body to be produced and defining a neck communicating said interior of said mold,
said neck having an inner periphery complementary to said calibrated neck opening to be produced,
a piercing blowing pin means comprising a hollow needle-shaped point,
said needle-shaped point substantially smaller than said inner periphery of said neck, and
said piercing blowing pin means adapted to be inserted through said neck of said mold and for piercing said at least one enclosed hollow body with said needle-shaped point thereby forming a pierced opening therein, and for feeding a pressure medium through said needle-shaped point and said pierced opening into said at least one enclosed hollow body thereby displacing and widening said at least one enclosed hollow body within the range of said pierced opening outwardly against said inner periphery of said neck.

9. The apparatus for forming a predetermined shaped hollow body with a calibrated neck opening, as set forth in claim 8, wherein
said piercing blowing pin means further comprises a calibrating pin portion substantially wider than said needle-shaped point and slightly smaller than said inner periphery of said neck and adapted to be inserted into said neck, and
said at least one hollow body being displaced and widened within the range of said pierced opening between said inner periphery of said neck of said mold and said calibrating pin portion.

10. The apparatus for forming a predetermined shaped hollow body with a calibrated neck opening, as set forth in claim 8, wherein
said neck and piercing blowing pin means having an axis crosswise to the axis of said starting product, thereby causing said pierced opening and said calibrated neck opening to be axially crosswise to said axis of said starting product.

References Cited

UNITED STATES PATENTS

| 2,890,485 | 6/1959 | Knowles | 18—5 X |
| 3,089,185 | 5/1963 | Di Settembrine | 18—5 X |
| 3,142,089 | 7/1964 | Wilkalis et al. | 18—5 |

FOREIGN PATENTS 688,997  3/1953  Great Britain.

J. SPENCER OVERHOLSER, *Primary Examiner.*

WILBUR L. McBAY, *Examiner.*